United States Patent Office 3,704,310
Patented Nov. 28, 1972

3,704,310
CHLORAL COMPOUNDS
Adolf Fischer, Mutterstadt, Friedrich Becke, Heidelberg, and Reinhold Kohlhaupt, Frankenthal, Germany, assignors to Badische Anilin- & Soda-Fabrik Aktiengesellschaft, Ludwigshafen (Rhine), Germany
No Drawing. Original application May 14, 1969, Ser. No. 824,661. Divided and this application Jan. 6, 1971, Ser. No. 104,493
Int. Cl. C07c 125/06
U.S. Cl. 260—482 C                          2 Claims

ABSTRACT OF THE DISCLOSURE

New and valuable chloral compounds having the formula:

$$Cl_3C-\underset{\underset{OH}{|}}{CH}-O-(CH_2)_n-R^1$$

in which $R^1$ denotes the radical $$R^3-\underset{\underset{R^2}{|}}{N}-\underset{\underset{O}{\|}}{C}-O-$$

$n$ denoting one of the integers from 1 to 6, $R^2$ denotes hydrogen or a lower alkyl radical or alkenyl radical and $R^3$ denotes hydrogen or the trichloroethylol radical $$CCl_3-\underset{\underset{OH}{|}}{CH}-$$

---

This application is a division of our application Ser. No. 824,661, filed May 14, 1969, now U.S. Pat. 3,634,452.

The chloral compounds have a good herbicidal action. In particular, they are suitable for controlling unwanted plants between crop plants without damaging the latter. The chloral compounds have an especially strong action on unwanted grassy plants.

The present invention relates to chloral compounds and herbicides containing them.

It is known to use chloralides, particularly glycolic acid chloralide (DAS 1,059,710) as herbicidal agents; however, their action is unsatisfactory.

An object of the invention is new and valuable chloral compounds. Another object of the invention is chloral compounds which have a strong herbicidal action. A further object of the invention is a process for controlling unwanted plants with chloral compounds without damaging crop plants. These and other objects of the invention are achieved by chloral compounds having the formula $$Cl_3C-CH-O-(CH_2)_n-R^1$$

in which $R^1$ denotes the radical $$R^3-\underset{\underset{R^2}{|}}{N}-\underset{\underset{O}{\|}}{C}-O-$$

$n$ denoting one of the integers from 1 to 6, $R^2$ denotes hydrogen or a lower alkyl radical or alkenyl radical (methyl, ethyl, propyl, isopropyl, butyl, isobutyl) and $R^3$ denotes hydrogen or the trichloroethylol radical $$CCl_3-\underset{\underset{OH}{|}}{CH}-$$

The agents for regulating plant growth according to this invention may be used as solutions, emulsions, suspension or dusts. The form of application depends entirely on the purpose for which the agents are being used; in any case it should ensure a fine distribution of the active ingredient.

For the preparation of solutions to be sprayed direct, hydrocarbons such as tetrahydronaphthalene and alkylated naphthalenes are suitable.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts, concentrates which are suitable for dilution with water may be prepared from active ingredient, emulsifying or dispersing agent and possibly solvent.

Dusts may be prepared by mixing or grinding the active ingredients with a solid carrier, e.g. clay, talc, diatomaceous earth or a fertilizer. It is also possible to mix the active ingredients with fungicides, insecticides or with other herbicidal active ingredients.

The active ingredients may be obtained by reaction of chloral with the corresponding amine or hydroxy compounds. The preparation of the active ingredients according to the invention is illustrated by the following examples:

EXAMPLE 1

N - (1 - hydroxy - 2 - trichloroethyl)-1'-hydroxy-2'-trichloroethoxyethylcarbamate (II)

$$CCl_3-\underset{\underset{OH}{|}}{CH}-NH-\underset{\underset{O}{\|}}{C}-O-CH_2-CH_2-O-\underset{\underset{OH}{|}}{CH}-CCl_3$$

525 parts of 2-hydroxyethylcarbamate in 4,500 parts of ethyl acetate is reacted with 1,475 parts of chloral. After the solvent has been distilled off, a pale yellow oil is obtained; $n_D^{20}=1.5021$.

The following comparative experiments illustrate the superiority of the compounds according to the invention over known active ingredients.

EXAMPLE 2

Loamy sandy soil is filled into pots and sown with the seeds of annual meadow grass (*Poa annua*), orchard grass (*Dactylis glomerata*), wild oats (*Avena fatua*), barnyard grass (*Echinochloa crus-galli*) and green foxtal (*Setaria viridis*). The soil is subsequently treated with 4 kg. of II and, for comparison, with 4 kg. of glycolic acid chloralide (III) having the formula $$\begin{array}{c}H_2C-C\underset{\diagdown}{\overset{O}{\|}}\\ \underset{\diagup}{|}\quad O\\ O-CH\\ |\\ CCl_3\end{array}$$

these amounts of the active ingredients each being dispersed in 500 liters of water per hectare, and planted with tomatoes. After 4 to 5 weeks it is ascertained that II has not only a stronger herbicidal action than III, but also superior compatibility with tomatoes. The results of the experiment may be seen from the following table:

|  | Active ingredient | |
|---|---|---|
|  | II | III |
| Tomatoes | 10 | 20–30 |
| Annual meadow grass | 80 | 60–70 |
| Orchard grass | 80 | 70 |
| Wild oat | 80–90 | 60–70 |
| Barnyard grass | 80 | 50–60 |
| Green foxtail | 80–90 | 60 |

NOTE.—0=No damage; 100=Total destruction.

EXAMPLE 3

Loamy sandy soil is placed in dishes; the seeds of beet (*Beta vulgaris*), soya beans (*Glycine hispida*) and large crabgrass (*Digitaria sanguinalis*) are sown in rows in each dish. The soil is subsequently treated with 4 kg. per hectare of II, this amount of the active ingredient being dispersed in 500 liters of water per hectare. The following results are ascertained after 4 to 5 weeks:

|  | Active ingredient I1 |
|---|---|
| Beet | 10 |
| Soya beans | 20 |
| Large crabgrass | 80–90 |

EXAMPLE 4

The plant soya beans (*Glycine hispida*), beet (*Beta vulgaris*), tomatoes (*Solanum lycopersicum*), annual meadow grass (*Poa annua*), orchard grass (*Dactylis glomerata*), barnyard grass (*Echinochloa crus-galli*) and green foxtail (*Setaria viridis*) are treated at a growth height of 3 to 12 cm. with 3 kg. per hectare of II, this amount of the active ingredient being dispersed in 500 liters of water per hectare.

After 3 to 4 weeks it is ascertained that the weeds annual meadow grass, orchard grass, barnyard grass and green foxtail are almost completely withered, whereas the plants soya beans, beet and tomatoes continue to grow almost undamaged.

We claim:
1. A chloral compound having the formula

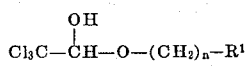

in which $R^1$ denotes the radical

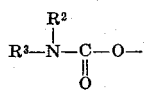

$n$ denotes one of the integers from 1 to 6, $R^2$ denotes hydrogen or a lower alkyl and $R^3$ denotes hydrogen or the trichloroethylol radical

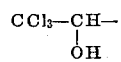

2. N-(1-hydroxy-2-trichloroethyl)-1'-hydroxy - 2' - trichloroethoxyethylcarbamate.

References Cited
UNITED STATES PATENTS

| 1,658,231 | 2/1928 | Dox et al. | 260—482 C |
| 3,372,181 | 3/1968 | Swintosky | 260—482 C |

LORRAINE A. WEINBERGER, Primary Examiner

P. J. KILLOS, Assistant Examiner